United States Patent
Ding et al.

(10) Patent No.: US 8,635,491 B2
(45) Date of Patent: Jan. 21, 2014

(54) STORAGE DEVICE MAINTENANCE IN A PORTABLE DEVICE BASED ON A POWER EVENT

(75) Inventors: Mingzhong Ding, Singapore (SG); KianKeong Ooi, Singapore (SG); JianGuo Zhou, Singapore (SG); HuaYuan Chen, Singapore (SG); Patrick TaiHeng Wong, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 509 days.

(21) Appl. No.: 11/863,955

(22) Filed: Sep. 28, 2007

(65) Prior Publication Data

US 2009/0089603 A1 Apr. 2, 2009

(51) Int. Cl.
*G06F 11/00* (2006.01)

(52) U.S. Cl.
USPC ............ 714/6.13; 714/5.1; 714/6.11; 714/22; 713/340

(58) Field of Classification Search
USPC ................ 714/5, 22, 5.1, 6.11, 6.13; 713/340
See application file for complete search history.

(56) References Cited

U.S. PATENT DOCUMENTS

| | | | |
|---|---|---|---|
| 5,345,347 A | 9/1994 | Hopkins et al. | |
| 5,682,273 A | 10/1997 | Hetzler | |
| 6,034,831 A * | 3/2000 | Dobbek et al. | 360/53 |
| 6,046,879 A * | 4/2000 | Hampshire | 360/77.08 |
| 6,263,453 B1 * | 7/2001 | Anderson | 714/22 |
| 6,281,676 B1 * | 8/2001 | Ottesen et al. | 324/212 |
| 6,289,484 B1 | 9/2001 | Rothberg et al. | |
| 6,467,054 B1 | 10/2002 | Lenny | |
| 6,608,729 B1 | 8/2003 | Willems et al. | |
| 6,622,252 B1 * | 9/2003 | Klaassen et al. | 713/320 |
| 6,678,831 B1 | 1/2004 | Mustafa et al. | |
| 6,721,685 B2 * | 4/2004 | Kodama | 702/184 |
| 6,760,850 B1 | 7/2004 | Atkinson et al. | |
| 6,772,366 B2 * | 8/2004 | Nguyen et al. | 714/10 |
| 6,847,502 B1 * | 1/2005 | Codilian | 360/77.04 |
| 6,865,048 B2 | 3/2005 | Koizumi et al. | |
| 6,892,313 B1 | 5/2005 | Codilian et al. | |
| 6,937,424 B2 * | 8/2005 | Chang et al. | 360/77.04 |
| 7,000,134 B2 * | 2/2006 | Tsukihashi | 713/340 |
| 7,075,744 B2 | 7/2006 | Cumpson et al. | |

(Continued)

FOREIGN PATENT DOCUMENTS

KR 681634 B1 * 2/2007

OTHER PUBLICATIONS

English machine translation of KR 10-0681634.*

(Continued)

*Primary Examiner* — Philip Guyton
(74) *Attorney, Agent, or Firm* — Alan G. Rego; Westman, Champlin & Koehler, P.A.

(57) ABSTRACT

The disclosure is related to monitoring a portable electronic device to detect an occurrence of a power event. A command can be sent to a data storage device to initiate a maintenance procedure on the data storage device. In a particular embodiment, a method includes monitoring a portable electronic device to detect an occurrence of a power event. The method also includes selectively sending a command to a data storage device to initiate a maintenance procedure on the data storage device when the occurrence of the power event is detected.

17 Claims, 4 Drawing Sheets

(56) References Cited

U.S. PATENT DOCUMENTS

| | | | |
|---|---|---|---|
| 7,168,010 B2* | 1/2007 | Yadavalli et al. | 714/42 |
| 7,290,172 B2* | 10/2007 | First et al. | 714/22 |
| 7,392,443 B2* | 6/2008 | Braun | 714/718 |
| 7,447,951 B2* | 11/2008 | Hwang et al. | 714/710 |
| 7,487,388 B2* | 2/2009 | Kim et al. | 714/6.13 |
| 2006/0146431 A1* | 7/2006 | Tsujimura et al. | 360/31 |
| 2006/0195755 A1* | 8/2006 | Brown | 714/754 |

OTHER PUBLICATIONS

Li, Xiaodong et al. "Performance Directed Energy Management for Main Memory and Disks", ACM SIGPLAN Notices, 2004, pp. 271-283, vol. 39, No. 11, ACM Press, New York, NY, USA.

Li, Kester et al. "A Quantitative Analysis of Disk Drive Power Management in Portable Computers", Proc. of Winter 1994 USENIX Conference, Jan. 1994, pp. 279-292.

* cited by examiner

STORAGE DEVICE MAINTENANCE IN A PORTABLE DEVICE BASED ON A POWER EVENT

BACKGROUND

The present disclosure relates generally to initiating a maintenance procedure on a data storage device.

Data storage devices are commonly used in portable electronic devices such as personal digital assistants (PDAs), mobile telephones, music players, video cameras, and digital cameras. Many of the portable devices that include data storage devices can be powered via a battery during use. Due to low costs and high capacity, the data storage device may be a disc drive that can be used in portable electronic devices. However, a disc drive in a portable electronic device can be exposed to more external shock or vibration than a disc drive in a desktop computer.

An external shock or vibration during a disc drive's read or write operation can cause one or more read or write retries. A retry scheme that exhausts a number of allocated retries may insert an entry in a defect table indicating that a specific physical sector location is defective. However, the specific sector identified as defective may have failed due to the external shock or vibration and the physical track location may be defect-free. This problem can cause the defect table to include unnecessary entries and potentially fill an allocated space reserved for the defect table. However, a disc drive in a portable device may not be able to perform a defect table cleanup procedure because the disc drive has entered an advanced power management mode due to limited power available from the battery. The advanced power management mode may disable a voice coil motor and turn off a spindle motor, which may also disable maintenance procedures including a defect table cleanup procedure.

Therefore, there is a need for an improved system and method of initiating a maintenance procedure on a data storage device.

SUMMARY

The disclosure is related to initiating a maintenance procedure on a data storage device. The disclosure is also related to monitoring a portable electronic device to determine an occurrence of a power event. A command can be sent to a data storage device to initiate a maintenance procedure on the data storage device.

In a particular embodiment, a method includes monitoring a portable electronic device to detect an occurrence of a power event. The method also includes selectively sending a command to a data storage device to initiate a maintenance procedure at the data storage device when the occurrence of the power event is detected.

In another particular embodiment a portable electronic device includes a controller operably programmed to execute a method comprising monitoring to determine when a power event occurs. The method also includes selectively sending a command to a data storage device to initiate a maintenance procedure upon detection of the power event.

In still another particular embodiment, a device includes a data storage medium and an interface for receiving commands from a host. The device also includes a controller operably coupled to the data storage medium and the interface. The controller is operably programmed to execute a method including receiving a first command from the host via the interface and selectively performing a maintenance operation on the data storage medium after the first command is received. The first command represents a change in power available from the host.

DETAILED DESCRIPTION

In the following detailed description of the embodiments, reference is made to the accompanying drawings which form a part hereof and in which are shown by way of illustration of specific embodiments. It is to be understood that other embodiments may be utilized and structural changes may be made without departing from the scope of the present invention.

Figure 1:
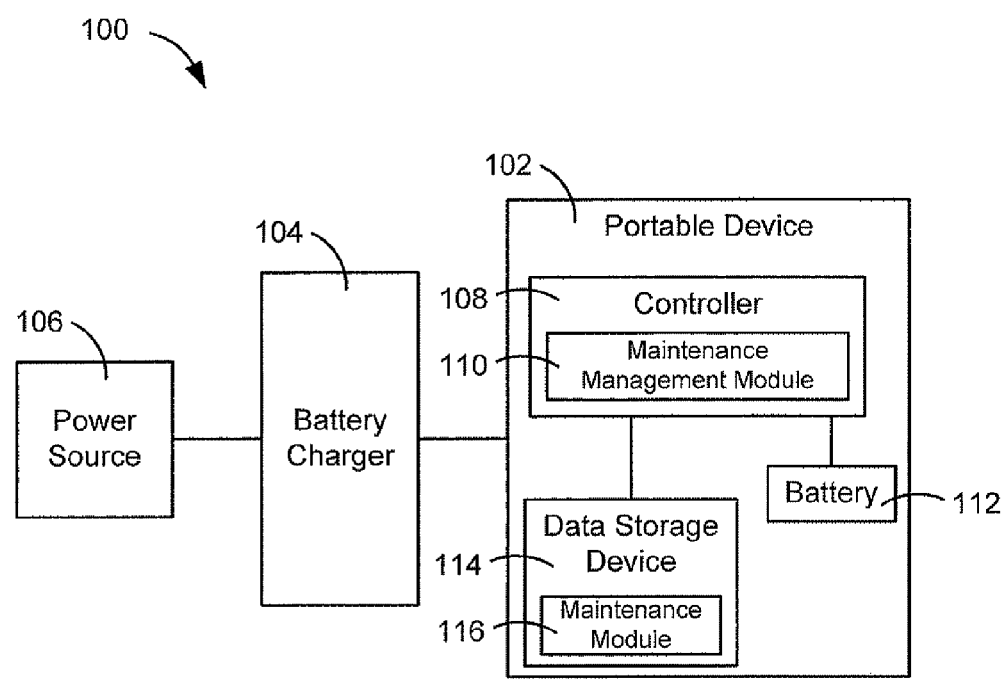
FIG. 1 is a particular illustrative embodiment of a system for initiating a maintenance procedure on a data storage device.

Referring to FIG. 1, a particular illustrative embodiment of a system for initiating a maintenance procedure on a data storage device is disclosed and generally designated 100. The system 100 includes a portable device 102 having a controller 108 coupled to a battery 112 and a data storage device 114. The battery 112 may be removable from the portable device 102. Also, the battery 112 may be internal or external to the portable device 102. The controller 108 can include a maintenance management module 110 and the data storage device 114 can include a maintenance module 116. The maintenance management module 110 and the maintenance module 116 may include firmware executable by a controller, such as controller 108 or a controller internal to the data storage device 114, respectively.

The portable device 102 may be a telephone, an audio player, a video player, a personal digital assistant, a video camera, a camera, or other electronic device having data storage. In a particular embodiment, the data storage device 114 may be a magnetic data storage device, such as a magnetic disc, magnetic tape, or a magnetic solid-state device (e.g. magnetoresistive random access memory (MRAM)). In another particular embodiment, the data storage device 114 may be a solid state memory device, an optical memory device, a magneto-optical memory device, any other type of memory device, or any combination thereof.

The system 100 may also include a battery charger 104. The battery charger 104 may be part of the portable device 102 or may be a separate component connectable to the portable device 102. The battery charger 104 may connect to a power source 106, such as an alternating current (AC) power source or a direct current (DC) power source. For example, the power source 106 may be an electrical outlet, a peripheral data bus of a computer, such as a universal serial bus (USB), or a vehicle outlet. The battery 112 may be coupled directly to the battery charger 104 and may include circuitry to enable charging of the battery 112.

During operation, the portable device 102 may be connected to the battery charger 104 and/or to the power source 106 by a user. Since the charging process may take from a few minutes to one or two hours, the maintenance management module 110 running on the controller 108 may detect the battery charging mode, or other power events, and issue a command to the data storage device 114. The command may bring the data storage device 114 out of an advanced power management mode and activate firmware, such as the maintenance module 116 of the data storage device 114 to execute a maintenance procedure. For example, the maintenance procedure may be a self-scan operation, such as a defect table cleanup, a servo re-calibration, or other operation.

In a particular embodiment, the controller 108 may monitor the portable device 102 to determine when a power event occurs. In a particular embodiment, the power event may include detecting charging of the battery 112. In another particular embodiment, the power event may include detecting a status of a battery charging mode. In another particular embodiment, the power event may include detecting when the battery 112 is operably coupled to the battery charger 104. In another particular embodiment, the power event may include detecting a power save mode of the portable device 102. In another particular embodiment, the power event may include detecting a change in a power mode of the portable device 102. In another particular embodiment, the power event may include detecting a level of a charge of the battery 112, such as no charge, a partial charge, or a full charge. In another particular embodiment, the power event may include detecting a connection to an AC power source. In another particular embodiment, the power event may include detecting a connection to a DC power source. In another particular embodiment, the power event may include detecting a connection to a powered peripheral bus of a computer, such as a USB.

The maintenance management module 110 may selectively send a command from the controller 108 to the data storage device 114 to initiate a maintenance procedure upon detection of the power event. In a particular embodiment, the command may be sent to the data storage device 114 when the battery 112 is operably connected to the battery charger 104 and when an amount of time since a last successful maintenance procedure is greater than a threshold. In a particular embodiment, the data storage device 114 may exit a power savings mode when the command to initiate the maintenance procedure is received.

The maintenance module 116 may receive a command from the controller 108 to initiate the maintenance procedure, such as a self-scan operation, and selectively perform the maintenance procedure. In a particular embodiment, the maintenance procedure may include a defect description table management operation. The defect description table management operation may include re-examining user defect table entries and removal of unnecessary defect table entries. In a particular embodiment the data storage device 114 may re-assess individual user defect entries by using a combination of one or more read, write, or verify operations. The re-assess process may select a location referenced in the defect table and perform one or more operations, such as write, read, or verify operations, to determine whether the location is usable based on pre-defined criteria.

In a particular embodiment, one of the pre-defined criteria may be that the physical memory location referenced in the defect table is physically defect free. A physical memory location that is physically defect free can be added to the defect table after a number of read/write retries are exhausted due to an external shock/vibration. These physical memory locations may still be usable under a normal working environment.

In another particular embodiment, one of the pre-defined criteria may be that the location referenced in the defect table was added to the defect table due to an earlier environment temperature. This can occur when a read/write operation at a relatively high temperature encounters a large repeatable ran-out (RRO). When a read/write operation occurs at an ambient temperature or relatively cold temperature, the RRO may be less or within a nominal operating range and the location referenced in the defect table may still be usable.

In yet another particular embodiment, one of the pre-defined criteria may be that the location referenced in the defect table is due to a particle that was detected on that location of a data storage medium. In a data storage device with moving parts, such as a disc drive with a spindle and an actuator, a particle may move to another location during operation and the original location referenced in the user defect table may be particle-free and usable.

When an entry is deemed defect free, it can be removed from the user defect table and the sector can be used to store data. A sector deemed defect free and removed from the defect list may be used to store data that was previously at that sector before the data was re-assigned to a spare sector. This may allow for the defect table size to be reduced, thus requiring less storage space. This may also allow for the reduction of the number of spare sectors reserved for allocation of defective sectors. The reduction of the defect table size and/or the reduction of the number of spare sectors may allow the data storage device 114 to improve format efficiency and to increase data storage capacity accessible to the user.

In another particular embodiment, the maintenance procedure may also include a servo re-calibration operation. The servo re-calibration operation may tune servo performance. Some servo parameters may vary from values that were calibrated during a factory test and the servo parameters may be re-calibrated during a maintenance procedure. For example, some mechanical components may drift during lift time, such as torque constant, bias force, and resonance mode frequencies. A servo re-calibration may re-tune these parameters to improve servo performance. Improving the servo tracking performance may allow the read/write retries to be reduced. This may further reduce the possibility that a data location without a physical defect is added to the defect table.

When the maintenance procedure is complete, the data storage device 114 may send a notification that the maintenance procedure is complete to the controller 108. The maintenance management module 110 may receive the notification from the data storage device 114 and then save a time, such as a timestamp, indicating when the maintenance procedure was completed. The controller 108 may also receive an interrupt based on an action of a user and send a second command to the data storage device 114 to stop the maintenance procedure. The action of the user may include disconnecting the data storage device 114 from the battery charger 104, disconnecting the battery charger 104 from the power source 106, or activation of the portable device 102 for use.

Figure 2:
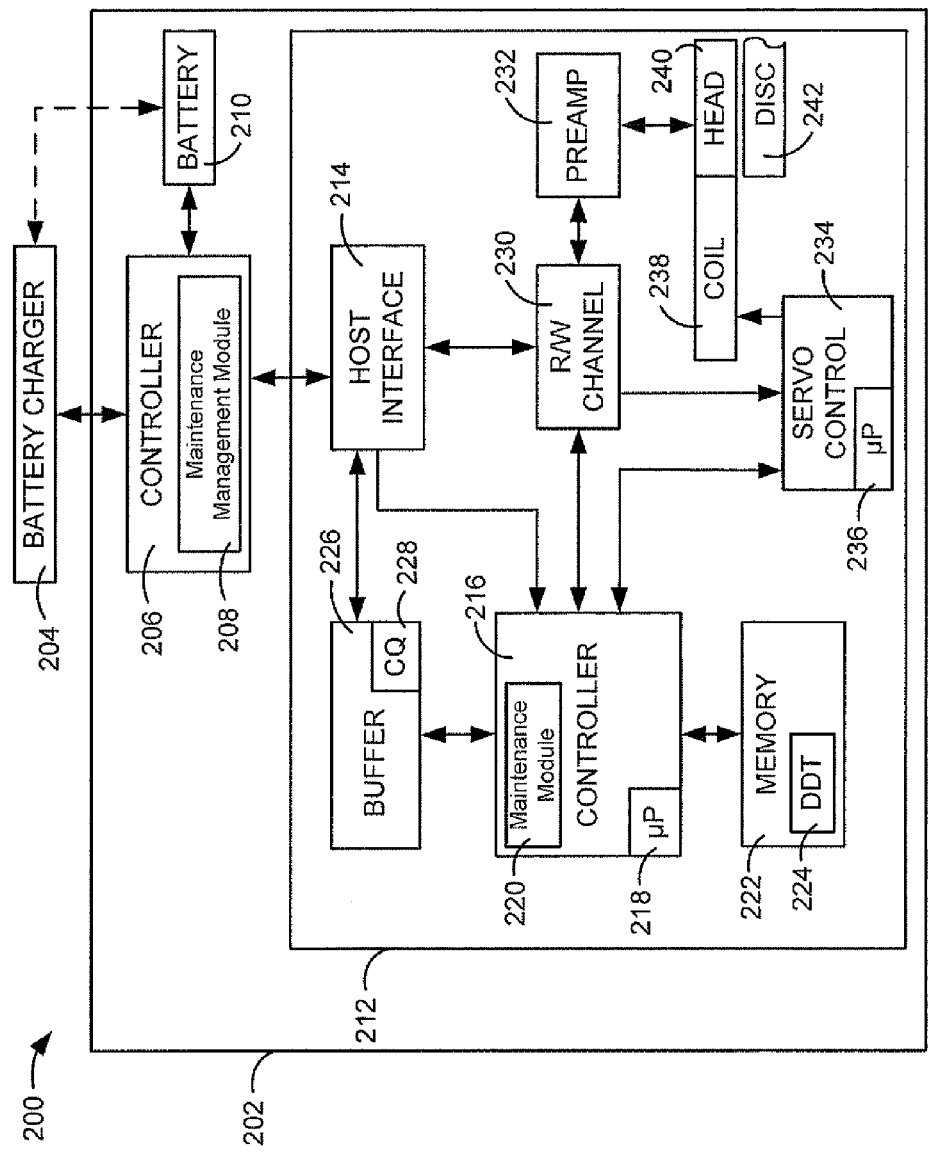
FIG. 2 is another particular illustrative embodiment of a system for initiating a maintenance procedure on a data storage device.

Referring to FIG. 2, a particular illustrative embodiment of a system for initiating a maintenance procedure on a data storage device is disclosed and generally designated 200. The system includes a portable device 202 that includes a controller 206 coupled to a data storage device, such as a disc drive 212. The system 200 can also include a battery 210 that may be coupled to the controller 206. The controller 206 may include a maintenance management module 208 that can send a command to the disc drive 212 to initiate a maintenance procedure.

The portable device 202 may be a mobile telephone, an audio player, a video player, a personal digital assistant, a video camera, a camera, or other type of electronic device having data storage. The disc drive 212 is just one representative example of a data storage device that may be used in the system 200. Other types of data storage devices may be used, such as another magnetic storage device, a solid state memory device, an optical memory device, a magneto-optical memory device, any other type of memory device, or any combination thereof.

The system 200 may also include a battery charger 204. The battery charger 204 may be part of the portable device 202 or may be a separate component connectable to the portable device 202. The battery charger 204 may connect to a power source, such as an alternating current (AC) power source or a direct current (DC) power source. For example, the power source may be an electrical outlet, a peripheral data bus of a computer, such as a universal serial bus (USB), or a vehicle outlet. The battery 210 may be connectable directly to the battery charger 204 and may include circuitry to enable charging the battery 210.

The disc drive 212 can communicate with the controller 206 and the maintenance management module 208 via a hardware/firmware based interface circuit 214. The disc drive 212 includes a programmable controller 216 with a processor 218 and a maintenance module 220. The maintenance module 220 may selectively perform a maintenance operation at the disc drive 212.

The programmable controller 216 can be coupled to a memory 222 that includes a defect description table (DDT) 224. The DDT 224 may be a user defect description table that may include entries based on defects detected during operation of the disc drive 212.

The programmable controller 216 may also be coupled to a buffer 226. The buffer 226 can temporarily store user data during read and write operations and can include a command queue (CQ) 228 where multiple pending access operations can be temporarily stored pending execution.

FIG. 2 further shows the disc drive 212 to include a read/write (R/W) channel 230 which encodes data during write operations and reconstructs user data retrieved from disc(s) 242 during read operations. A preamplifier/driver circuit (preamp) 232 applies write currents to the head(s) 240 and provides pre-amplification of readback signals.

A servo control circuit 234 uses servo data to provide the appropriate current to a coil 238 to position the head(s) 240. The controller 216 communicates with a processor 236 to move the head(s) 240 to desired locations on the disc(s) 242 during execution of various pending commands from the command queue 228.

During operation, the portable device 202 may be connected to the battery charger 204 and/or to a power source by a user. Since the charging process may take from a few minutes to one or two hours, the host firmware, i.e. the maintenance management module 208, running on the controller 206 may detect a battery charging mode, or other power events, and issue a command to the disc drive 212. The command may bring the disc drive 212 out of an advanced power management mode, such as a power savings mode, and activate firmware, i.e. the maintenance module 220, to execute a maintenance procedure at the disc drive 212. For example, the maintenance procedure may be a self-scan operation, such as a defect table cleanup, a servo re-calibration, or other operation.

In a particular embodiment, the controller 206 may monitor the portable device 202 to determine when a power event occurs. In a particular embodiment, the power event may include detecting charging of the battery 210. In another particular embodiment, the power event may include detecting the battery 210 operably coupled to the battery charger 204. In another particular embodiment, the power event may include detecting a power save mode of the portable device 202. In another particular embodiment, the power event may include detecting a level of a charge of the battery 210, such as no charge, a partial charge, or a full charge. In another particular embodiment, the power event may include detecting a connection to an AC power source. In another particular embodiment, the power event may include detecting a connection to a DC power source. In another particular embodiment, the power event may include detecting a connection to a powered peripheral bus of a computer, such as a USB.

The maintenance management module 208 may selectively send a command from the controller 206 to the disc drive 212 to initiate a maintenance procedure upon detection of the power event. In a particular embodiment, the command may be sent to the disc drive 212 when the battery 210 is operably connected to the battery charger 204. In another particular embodiment, the controller 206 may decide when to send the command based on an amount of time since a last completed maintenance procedure. In a particular embodiment, the disc drive 212 may exit a power savings mode when the command to initiate the maintenance procedure is received.

The maintenance module 220 may receive the command from the controller 206 to initiate the maintenance procedure, such as a self-scan operation, and selectively perform the maintenance procedure. In a particular embodiment, the maintenance procedure may include a defect description table management operation. The defect description table management operation may include re-examining user defect table entries and removal of unnecessary defect table entries from the DDT 224. In a particular embodiment, the disc drive 212 may re-assess individual user defect entries in the DDT 224 by using a combination of one or more read, write, or verify operations. The re-assess process may select a location referenced in the DDT 224 and perform one or more operations, such as write, read, or verify operations, to determine whether the location is usable based on a pre-defined criteria.

In a particular embodiment, one of the pre-defined criteria may be that the location referenced in the DDT 224 is physically defect free. A physical location that is physically defect free can be added to the DDT 224 after a number of read/write retries are exhausted due to an external shook/vibration. These physical locations may still be usable under a normal working environment.

In another particular embodiment, one of the pre-defined criteria may be that the location referenced in the DDT 224 was added to the defect table due to an earlier environment temperature. This can occur when a read/write operation at a relatively high temperature encounters a large repeatable run-out (RRO). When a read/write operation occurs at an ambient temperature or relatively cold temperature, the RRO may be less or within a nominal operating range and the location referenced in the defect table may still be usable.

In yet another particular embodiment, one of the pre-defined criteria may be that the location referenced in the DDT 224 is due to a particle that was detected on that location of the disc(s) 242. In a disc drive, a particle may be moved to another location during operation, such as from movement of an actuator (not shown) or spinning of the disc(s) 242, and the original location referenced in the user DDT 224 may be particle-free and usable.

When an entry is deemed defect free, it can be removed from the DDT 224 and the sector can be used to store data. A sector deemed defect free and removed from the DDT 224 may be used to store data that was previously at that sector before the data was re-assigned to a spare sector. This may allow for the DDT 224 size to be reduced, thus requiring less storage space. This may also allow for the reduction of the number of spare sectors reserved for allocation of defective sectors. The reduction of the defect table size and/or the reduction of the number of spare sectors may allow the disc drive 212 to improve format efficiency and to increase data storage capacity accessible to the user.

In another particular embodiment, the maintenance procedure may also include a servo re-calibration operation. The servo re-calibration operation may tune servo performance. Some servo parameters may vary from values that were calibrated during a factory test and the servo parameters may be re-calibrated during a maintenance procedure. For example, some mechanical components may drift during lift time, such as torque constant, bias force, and resonance mode frequencies. A servo re-calibration may re-tune these parameters to improve servo performance. Improving the servo tracking performance may allow the read/write retries to be reduced. This may further reduce the possibility that a data location without a physical defect is added to the DDT 224.

When the maintenance procedure is complete, the disc drive 212 may send a notification to the controller 206 that the maintenance procedure is complete. The maintenance management module 208 may receive the notification from the disc drive 212 and then save a time, such as a timestamp, indicating when the maintenance procedure was completed. The controller 206 may also receive an interrupt based on an action of a user and send a second command to the disc drive 212 to stop the maintenance procedure. The action of the user may include disconnecting the portable device 202 from the battery charger 204, disconnecting the battery charger 204 from the power source, or activation of the portable device 202 for use.

Figure 3:
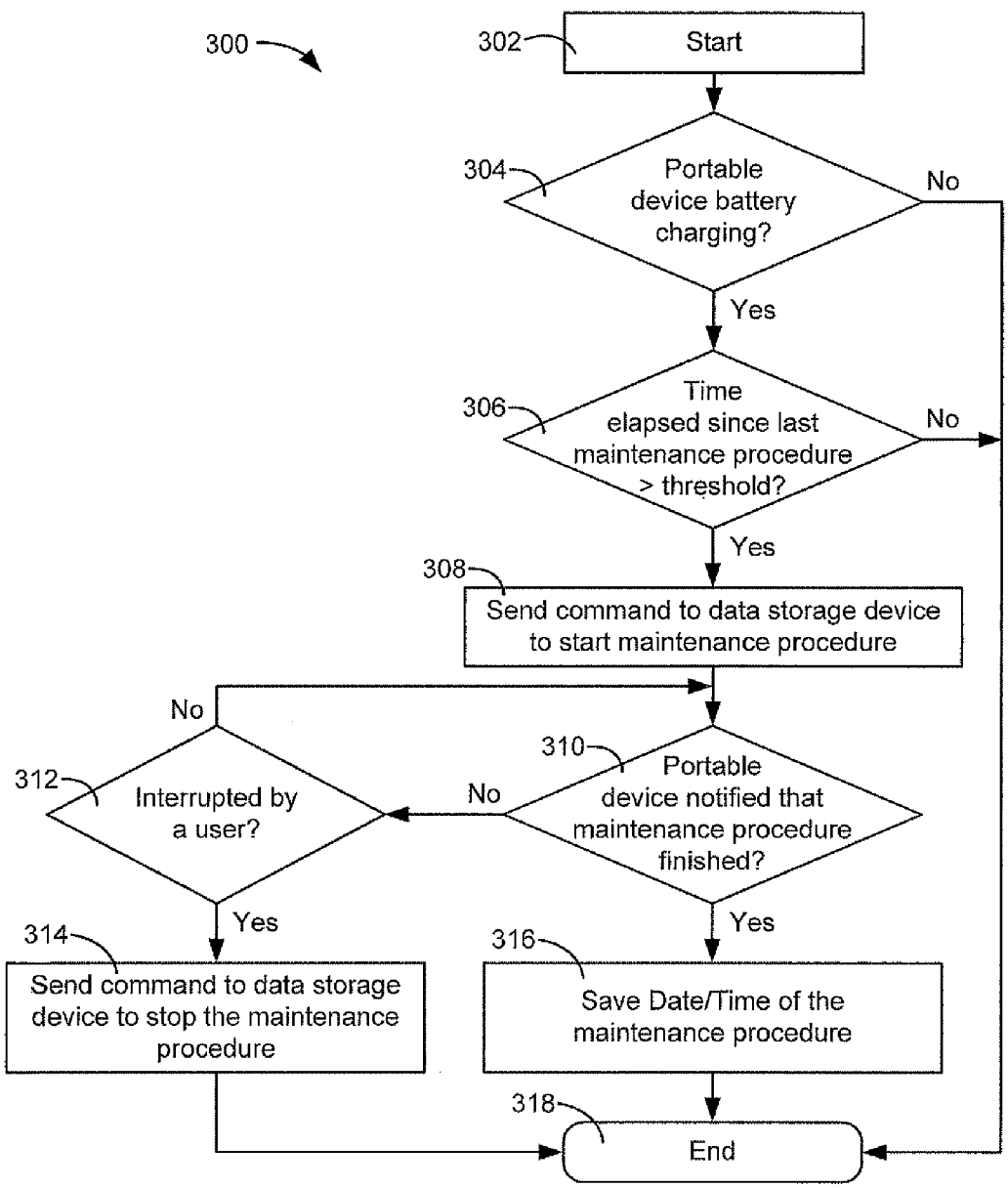
FIG. 3 is a flow diagram of a particular illustrative embodiment of a method of initiating a maintenance procedure on a data storage device.

Referring to FIG. 3, a particular illustrative embodiment of a method of initiating a maintenance procedure on a data storage device is disclosed and generally designated 300. The method 300 may be implemented in software or hardware. For example, the method 300 may be implemented by the controller 108 shown in FIG. 1 or the controller 206 shown in FIG. 2. The method 300 can start, at 302. The method 300 may be executed continuously or may be executed selectively on a device, such as the portable device 102 shown in FIG. 1 or the portable device 202 shown in FIG. 2.

In a particular embodiment, the method 300 includes determining if a portable device's battery is charging, at 304. This is just one example of a power event that may be determined or detected. Other embodiments may include determining when a battery is operably coupled to the battery charger, determining a power save mode of the portable device, or determining a level of a charge of a battery, such as no charge, a partial charge, or a full charge. Still other embodiments may include, determining when a portable device is connected to an AC power source, determining when a portable device is connected to a DC power source, or determining when a portable device is connected to a powered peripheral bus, such as a USB.

When the battery is not charging, the method 300 ends, at 318. In a particular embodiment, when the battery is charging, the method 300 includes determining an amount of time that has elapsed since a last successful scan occurred and determining when that amount of time is greater than a threshold, at 306. The amount of time may be determined from stored data indicating when a last successful maintenance procedure occurred. When the amount of time is not greater than the threshold, the method ends, at 318.

When the amount of time is greater than the threshold, the method 300 may include sending a command to the data storage device to start a maintenance procedure, at 308. The command to start the maintenance procedure may include data that indicates a power event has occurred at a portable device.

In a particular embodiment, the maintenance procedure may comprise a self-scan mode. In another particular embodiment, the maintenance procedure may include a defect description table management. The defect description table management may include modifying content of a defect description table. The defect description table management may also include modifying a spare sector allocation for a data storage medium of the data storage device. In still another particular embodiment, the maintenance procedure may include a servo calibration. In a particular embodiment, the data storage device 114 may exit a power savings mode when the command to initiate the maintenance procedure is received. In yet another particular embodiment, the maintenance procedure may include a fly-height adjustment, a pressure calibration, or a temperature calibration.

The method 300 also can include monitoring the portable device for a notification from the data storage device that the maintenance procedure has finished, at 310. While the portable device has not received the notification that the maintenance procedure has finished, the method 300 may include monitoring the portable device for an interrupt received based on an action of a user, at 312. When the interrupt is not received, the method 300 keeps monitoring for a notification that the maintenance procedure has finished and for an interrupt.

When the portable device receives a notification that the maintenance procedure has finished, the method 300 may include saving a time or date of the finished maintenance procedure, at 316. The method 300 may save a timestamp to memory to indicate a last completed maintenance procedure. The method 300 may then end, at 318.

When an interrupt is received by the portable device prior to a notification that the maintenance procedure has finished, the method 300 may send a command to the data storage device to stop the maintenance procedure, at 314. The method 300 may then end, at 318.

Figure 4:
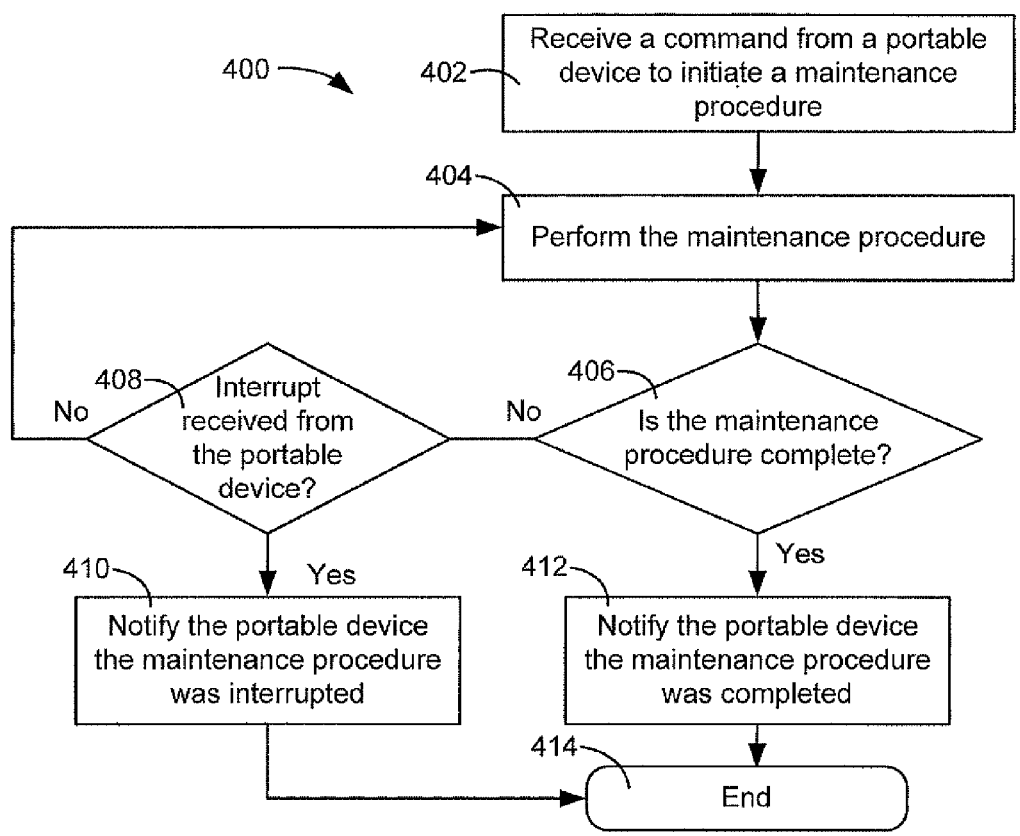
FIG. 4 is a flow diagram of another illustrative embodiment of a method of initiating a maintenance procedure on a data storage device.

Referring to FIG. 4, another illustrative embodiment of a method of initiating a maintenance procedure on a data storage device is disclosed and generally designated 400. The method 400 may be implemented in software or hardware at a data storage device. For example, the method 400 may be implemented by the controller 216 shown in FIG. 2. The method 400 may include receiving a command from a host to initiate a maintenance procedure, at 402.

In a particular embodiment, the maintenance procedure may include a defect description table management operation. In another particular embodiment, the maintenance procedure may include a servo calibration operation. In a particular embodiment, the data storage device may exit a power savings mode when the command to initiate the maintenance procedure is received.

The method 400 can then include the data storage device performing the maintenance procedure, at 404. The data storage device may determine when the maintenance procedure is complete, at 406.

While the maintenance procedure has not finished, the method 400 may include monitoring for an interrupt received from the portable device, at 408. When the interrupt is not received, the method 400 may wait for completion of the maintenance procedure or for an interrupt.

When the maintenance procedure has finished, the method 400 may include notifying the portable device that the maintenance procedure was completed, at 412. The method 400 may send a signal or instruction to the portable device to signify that the maintenance procedure was completed and the method may then end, at 414.

When an interrupt is received by the data storage device prior to the maintenance procedure being completed, the method 400 may send a notification to the portable device that the maintenance procedure was interrupted, at 410. The method 400 may then end, at 414.

The systems and methods described herein may allow for the a defect description table size to be reduced, thus requiring less storage space. The systems and methods may also allow for the reduction of the number of spare sectors reserved for allocation of defective sectors. The reduction of the defect table size and/or the reduction of the number of spare sectors may allow a data storage device to improve a format efficiency and to increase a data storage capacity accessible to a user. Further, the systems and methods described herein may provide a servo re-calibration that may re-tune parameters to improve servo performance and may allow a number of read/write retries to be reduced. This may further reduce the possibility that a physical data location without a physical defect is added to the defect description table.

In accordance with various embodiments, the methods described herein may be implemented as one or more software programs running on a computer processor or controller, such as the controller 108, the controller 206, or the controller 216. In accordance with another embodiment, the methods described herein may be implemented as one or more software programs running on a host device, such as a cellular telephone, a digital music player, or a video camera that is using a disc drive. Dedicated hardware implementations including, but not limited to, application specific integrated circuits, programmable logic arrays and other hardware devices can likewise be constructed to implement the methods described herein. In accordance with another embodiment, a computer readable medium may includes instructions to cause a processor to execute one or more of the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
incorrectly identifying physically defect-free and particle-free memory locations as defective locations in a defect description table for a data storage device due to an occurrence of a large repeatable run out during a read or write operation on the physically defect-free and particle-free memory locations;
incorrectly assigning the physically defect-free and particle-free memory locations to spare locations;
monitoring an electronic device to detect an occurrence of a power event; and
sending a command to the data storage device to initiate a maintenance procedure to remove unnecessary entries, corresponding to the physically defect-free and particle-free memory locations incorrectly identified as defective locations and assigned to the spare locations, from the defect description table when the occurrence of the power event is detected.

2. The method of claim 1 further comprising:
receiving a notification from the data storage device that the maintenance procedure to remove unnecessary entries in a defect description table has finished; and
saving a date and time that the maintenance procedure to remove unnecessary entries in a defect description table finished successfully upon receiving the notification that the maintenance procedure has finished.

3. The method of claim 1 further comprising:
receiving an interrupt based on an action of a user; and
sending a second command to the data storage device to stop the maintenance procedure.

4. The method of claim 1 wherein the maintenance procedure further comprises a servo calibration.

5. The method of claim 1 wherein the maintenance procedure further comprises:
determining a memory location from an entry in the defect description table;
performing at least one operation to determine whether the memory location is usable; and
removing the entry from the defect description table when the memory location is determined to be usable.

6. The method of claim 1 and wherein the large repeatable run out is caused due to a temporary change in a condition of the data storage device.

7. The method of claim 6 and wherein the temporary change in the condition of the data storage device is a change in a temperature of the data storage device.

8. An electronic device comprising:
a controller operably programmed to:
monitor for an occurrence of a power event; and
send a command to a data storage device to initiate a maintenance procedure that removes unnecessary entries, corresponding to physically defect-free and particle-free storage locations incorrectly identified as defective locations and incorrectly assigned to spare locations, from a defect description table of the data storage device upon detection of the power event,
wherein the electronic device determines the physically defect-free and particle-free storage locations to be defective locations due to an occurrence of a large repeatable run out during a read or write operation on the physically defect free storage locations.

9. The portable electronic device of claim 8 wherein the controller and the data storage device are within a single housing.

10. The electronic device of claim 8 and wherein the large repeatable run out is caused due to a temporary change in a condition of the data storage device.

11. The electronic device of claim 10 and wherein the temporary change in the condition of the data storage device is a change in a temperature of the data storage device.

12. A device comprising:
a data storage medium;
an interface for receiving commands from a host; and
a controller operably coupled to the data storage medium and the interface, the controller configured to:
receive a command related to a power event from the host via the interface;
in response to receiving the command, exit an advanced power management mode that had disabled at least part of the device; and
selectively perform a maintenance operation to remove unnecessary entries, corresponding to physically defect-free and particle-free storage locations incorrectly identified as defective locations and incorrectly assigned to spare locations, from a defect description table for the data storage medium after the command is received,
wherein the device determines the physically defect-free and particle-free memory locations to be defective locations due to an occurrence of a large repeatable run out during a read or write operation on the physically defect free storage locations.

13. The device of claim 12 wherein the maintenance operation further comprises a servo calibration.

14. The device of claim 12 further comprising a maintenance management module configured to:
determine a location of an entry in the defect description table;
perform at least one operation to determine whether the location is usable; and
remove the entry from the defect description table when the location is determined to be usable.

15. The device of claim 14, wherein the location is determined to be usable when the location is physically defect free.

16. The device of claim 14 further comprising a host electronic device comprising a controller configured to monitor for the power event and selectively send the command to the device to initiate the maintenance procedure when the power event is detected.

17. The device of claim 16 wherein the power event comprises at least one power event selected from the group consisting of a battery charging, a battery coupled to a battery charger, a battery uncoupled from a battery charger, a power save mode of the host, a level of charge of a battery, a connection of the host to an alternating current (AC) power source, a connection of the host to a direct current (DC) power source, and a connection of the host to a powered computer bus.

* * * * *